United States Patent
Welschof

[11] 3,935,717
[45] Feb. 3, 1976

[54] UNIVERSAL JOINT

[75] Inventor: Hans-Heinrich Welschof, Obertshausen, Germany

[73] Assignee: Lohr & Bromkamp GmbH, Germany

[22] Filed: Mar. 25, 1974

[21] Appl. No.: 454,172

[30] Foreign Application Priority Data
Mar. 26, 1973  Germany............................ 2314904

[52] U.S. Cl............................................ 64/21; 64/8
[51] Int. Cl.²................................................ F16D 3/30
[58] Field of Search................................. 64/21, 8, 7

[56] References Cited
UNITED STATES PATENTS

| | | | |
|---|---|---|---|
| 1,975,758 | 10/1934 | Stuber................................ | 64/21 |
| 3,362,192 | 1/1968 | Orain.................................. | 64/21 |
| 3,464,232 | 9/1969 | Hutchinson........................ | 64/21 |
| 3,540,232 | 11/1970 | Breuer............................... | 64/8 |

Primary Examiner—Samuel Scott
Assistant Examiner—R. Heald
Attorney, Agent, or Firm—Hill, Gross, Simpson, Van Santen, Steadman, Chiara & Simpson

[57] ABSTRACT

A constant velocity or homo-kinetic universal joint transferring torque through at least three ball members between inner and outer coupling members and held by a cage in a common plane bisecting the angle between the axes of the coupling members. The radial dimension of the joint is kept at a minimum and the cage rides on spherical walls of the inner and outer coupling members and has circumferentially spaced, radial lugs increasing the guide surfaces of the cage windows. The cage is positioned normal to the open face of the outer coupling member, pushed into the coupling member, rotated circumferentially to align the lugs to fit into the grooves of the coupling member, and then rotated axially into the plane of the coupling member to hold the coupling members in fixed axial relation.

12 Claims, 7 Drawing Figures

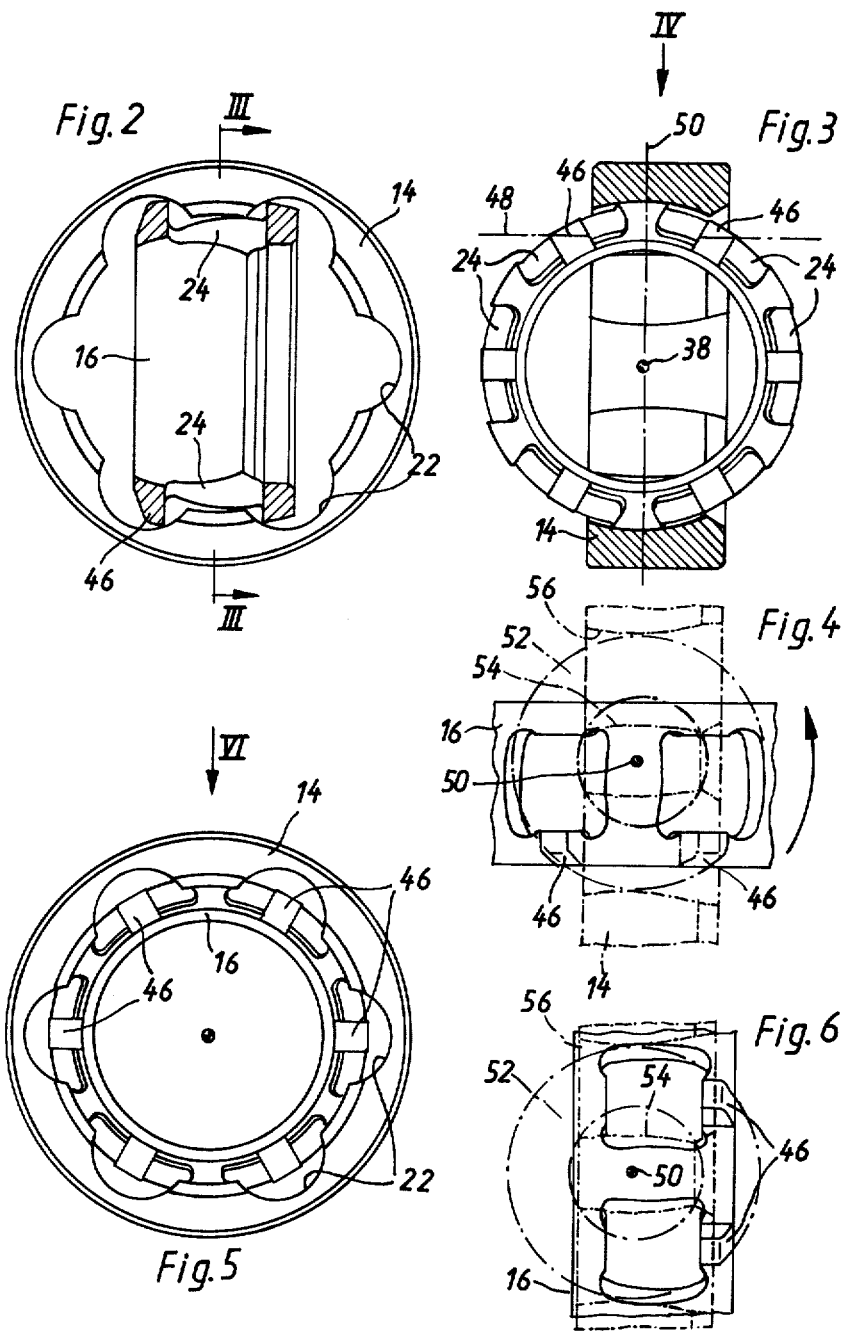

UNIVERSAL JOINT

BACKGROUND OF THE INVENTION

1. Field of the Invention

This invention relates to the art of constant velocity or homo-kinetic ball-type universal joints and particularly to the reduction of the overall radial dimensions of such joints by increasing the ball guide surfaces with radially projecting lugs so that the ball members are sufficiently guided and held with relatively thin cages.

2. Prior Art

Universal joints transferring torque between coupling members by balls which are held by a cage in a common plane bisecting the angle between the axes of the coupling members are known in the art as for example, in U.S. Letters Pat. No. 2,046,584 issued July 7, 1936. The cages for these joints were relatively thin, thus providing only small ball guide surfaces.

German published patent application No. 1,575,828, published May 14, 1970 discloses a homo-kinetic universal joint with a cage having lugs projecting radially over its spherically shaped outer surface but this surface rides on a cylindrical inner surface of the outer coupling member and axial shifting of the coupling members are accommodated.

SUMMARY OF THIS INVENTION

This invention now provides a homo-kinetic ball-type universal joint of minimum radial dimensions where the coupling members are held against axial shifting, the ball members are held in a common plane which bisects the angle between the axes of the coupling members by a cage which rides on the outer spherical surface of the inner coupling member which is centered on one side of the plane of the ball members and on the inner spherical surface of the outer coupling member which is centered on the opposite side of the ball plane. Radially projecting circumferentially spaced lugs on at least one end of the cage project either radially inward into the ball receiving grooves of the inner coupling member, or radially outward into ball receiving grooves of the outer coupling member to afford additional guiding surface for the ball members. According to this invention, the radial dimensions of the universal joints are held at a minimum without lessening the outer diameter of the inner coupling member. While this arrangement reduces the radial thickness of the space between the coupling members for receiving the ball cage, the invention insures ample guide wall surfaces for the ball members in the windows of the cage by providing lugs or noses projecting radially from at least one end of the cage into the ball receiving grooves of either the inner or outer couplings, or both. These lugs in any desired sectional plane which extends at a right angle to an axis through the center of the spherical outer surface of the cage and through the center between adjacent windows of the cage lie in an annular area, whose inner circle circumscribes the adjacent ball grooves and whose outer circle is circumscribed by the said ball grooves, said annular area being concentric to said axis.

The cage of this invention can be mounted between the coupling members in the same manner as a cage not equipped with the lug members and is inserted in the outer coupling member in that the cage is first pushed into the outer coupling member along the axis thereof in a position where the axis of the cage intersects the axis of the outer coupling member at a right angle wherein two diametrically opposed stems or legs between two adjacent ball grooves of the outer coupling member engage diametrically opposite windows of the cage in the circumferential direction thereof, and when the center point of its spherically shaped outer surface registers with the center point of the spherical inner surface of the outer coupling member, the cage is rotated about its own axis by half the pitch angle between adjacent windows, and the cage is finally rotated 90° into operating position, the axis of that rotation extending through the center of the spherical outer surface of the cage and the center between adjacent windows.

In the embodiment where the lugs project radially inward, the inner coupling member is assembled with the cage in the same manner.

It is important that the end surfaces of the windows of the cage which are at right angles to the axis of the cage should have the greatest available radial guidance for the ball members of the cage without, however, preventing the insertion of the cage as described above.

In a preferred embodiment of the invention, the cage has a generally wedge-shaped cross section and the lugs are on the ends of the windows toward which the cage tapers and projects radially so that the total thickness of the cage over these lugs is the same as the radial thickness of the cage at the other ends of the windows. In this arrangement, maximum guide wall surfaces are obtained without interfering with the assembly of the cage in the coupling members.

It is then an object of this invention to provide a constant velocity or a homo-kinetic ball-type universal joint with a reduced overall radial dimension and a ball cage filling the space between the inner and outer coupling members and having lugs affording maximum guide wall surfaces at the windows of the cage.

Another object of the invention is to reduce the overall radial dimensions of ball-type constant velocity univeral joints.

A still further object of the invention is to provide a ball-type homo-kinetic universal joint with coupling members held against axial shifting and ball members held by a cage in a plane which bisects the axes between the coupling members and has circumferentially spaced radially extending lugs increasing the guide wall surfaces at the windows of the cage.

Another object of the invention is to provide a homo-kinetic ball-type universal joint with an outer coupling member having an inner spherical bearing wall, an inner coupling member having an outer spherical bearing wall, registering axial grooves in the coupling members, torque transmitting balls riding in said grooves, a tapered cage holding said balls in a common plane and riding on the spherical surfaces of the coupling members and lugs projecting radially from the thin end of the cage to increase the ball guiding surfaces of the cage windows.

Other and further objects of this invention will become apparent to those skilled in this art from the following detailed description of the attached sheets of drawings diagrammatically illustrating an embodiment of the invention.

IN THE DRAWINGS

FIG. 2 is a front view of the outer coupling member of the joint of FIG. 1 showing the manner in which the cage is installed and illustrating the cage in vertical cross section;

FIG. 3 is a cross sectional view along the line III—III of FIG. 2 with the cage shown in elevation;

FIG. 4 is a fragmentary phantom view in the direction of the arrow IV of FIG. 3;

FIG. 5 is a front view similar to FIG. 3 but illustrating the cage turned 90° in the plane of the outer coupling member;

FIG. 6 is a view similar to FIG. 4 but taken in the direction of the arrow VI in FIG. 5.

AS SHOWN IN THE DRAWINGS

Figure 1:
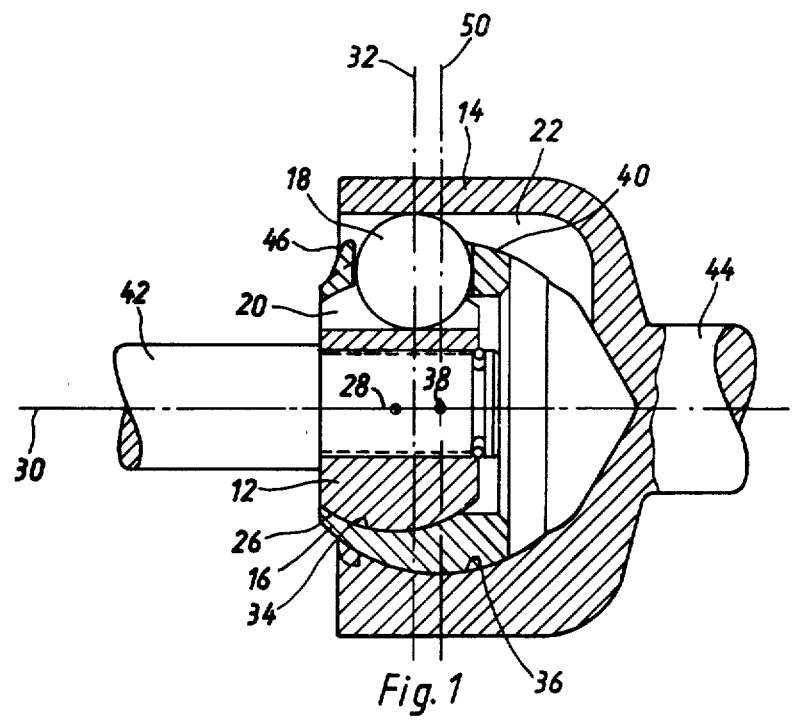
FIG. 1 is a longitudinal sectional view, with parts in elevation, of a constant velocity or homo-kinetic ball-type universal joint with a first embodiment of a ball cage according to this invention.

The constant velocity or homo-kinetic universal joint of FIGS. 1 to 6 includes an inner coupling member 12, an outer coupling member 14, a cage 16 between the coupling members and a set of balls 18. The balls 18 are guided in longitudinal grooves 20 of the inner coupling member 12 and 22 of the outer coupling member 14 and are held in windows 24 of the cage 12 in a common plane.

The inner coupling member 12 has a spherical outer surface 26 struck from a radius having a center point 28 on the axis 30 of the inner coupling member 12 which is spaced laterally to the left of the common plane 32 of the balls 18. The cage 16 has a complementary spherical inner surface 34 riding on the outer surface 26 of the inner coupling member 12.

The outer coupling member 14 has a spherical inner surface 36 with a center point 38 on the axis of the outer coupling member but offset laterally to the right of the common plane of the balls 18. The center points 28 and 38 are thus spaced on opposite sides of the plane 32. The cage 16 has an outer spherical surface 40 complementary with the spherical inner surface 36 of the outer coupling member 14.

A shaft 42 extends through the inner coupling member 12 and is fixed thereto. The outer coupling member 14 has an integral shaft 44 projecting therefrom.

The spacing of the center points 28 and 38 for the inner spherical surface 34 and the outer spherical surface 40 of the cage 16 provides a cross section for the cage which tapers toward one axial direction which as shown in the lower half of FIG. 1, is to the left. Thus, the radial thickness dimension of the cage 16 decreases toward the left to such an extent that the cage could not provide sufficient guidance for the balls 18 if it were limited exclusively on its radial outer side by the spherical outer surface 40.

However, according to this invention, a sufficient guidance for the balls 18 is provided on the left side of the windows 24 of the cage 16 by providing lugs or noses 46 in the center of each window 24 which project radially beyond the spherical outer surface of this end of the cage. In this manner, the cage has in the area of each of these nose members or lugs, approximately the same outer diameter as at the opposite right-hand end of the windows 24, as viewed in FIG. 1.

In order that the lugs 46 will not prevent the installation of the cage 16 in the outer coupling member 14, as shown in FIG. 3, all of the lugs 46, in any desired sectional plane 48 normal to the axis 50 extending through the center point 38 of the spherical outer surface of the cage 16 and also through the mid point between adjacent windows 24, lie within an annular area 52 concentric with the axis 50 and the inner circle of this annular area 52 circumscribes all inner limit lines 54 of the ball grooves with reference to the axis 50, lying in the same sectional plane 48. The outer circle of this annular area 52 is circumscribed by the limit lines 56 of the ball grooves 22 lying in the same sectional plane 48. This limiting of the radial dimensions of the lugs 46 accommodates rotation of the cage 16 about the axis 50 and the lugs 46 then do not overlap with the coupling member 14 as each of these nose members or lugs 42 upon complete rotation of the cage 16 about the axis 50 would pass through two ball grooves 22 of the outer coupling member 14 arranged symmetrically with the axis 50.

Thus, the design of the cage 16 makes it possible to slide the cage in the outer coupling member 14 in the manner illustrated in FIG. 2 where the axis of the cage intersects the axis 30 of the outer coupling member at right angles and then rotating the cage about its own axis for half the distance between two adjacent windows 24. Thus, if the cage has six windows as illustrated, it will be rotated about 30° in order to obtain the position of FIGS. 3 and 4. Then with the cage 16 in the position of FIGS. 3 and 4, it may be tilted 90° about the axis 50, bringing the cage into the position of FIGS. 5 and 6, where each of the windows 24 is positioned radially opposite a ball groove 22 of the outer coupling member 14 and seats the lug 46 in this ball groove. Next, the balls 18 are inserted into the windows 24 from the inner periphery of the cage 16 and next, the inner coupling member 12 is tilted axially into the cage 16. Finally, the shaft 42 is fixed in the coupling 12.

From the above descriptions it will, therefore, be understood that the cage is inserted normal to the open face of the outer coupling member 14 as shown in FIG. 2 with the circumferential rim ends of the cage lying in the ball grooves 22 which are adjacent the inner spherical wall 36 of the coupling member 14 and then the cage is rotated about its own axis to position diametrically opposed rib peripheral portions of the cage into registration with the spherical wall so that the cage can be tilted on the axis 50 as shown in FIGS. 3 and 4, whereupon it is tilted 90° into axially fixed relationship with the coupling. Then the balls are dropped into the cage from the inner periphery of the cage to extend into the grooves or pockets 22 and next, the inner coupling 12 is then tilted into position to receive the balls 18 and the grooves 20 and to ride on the inner spherical wall 34 of the cage.

Figure 7:
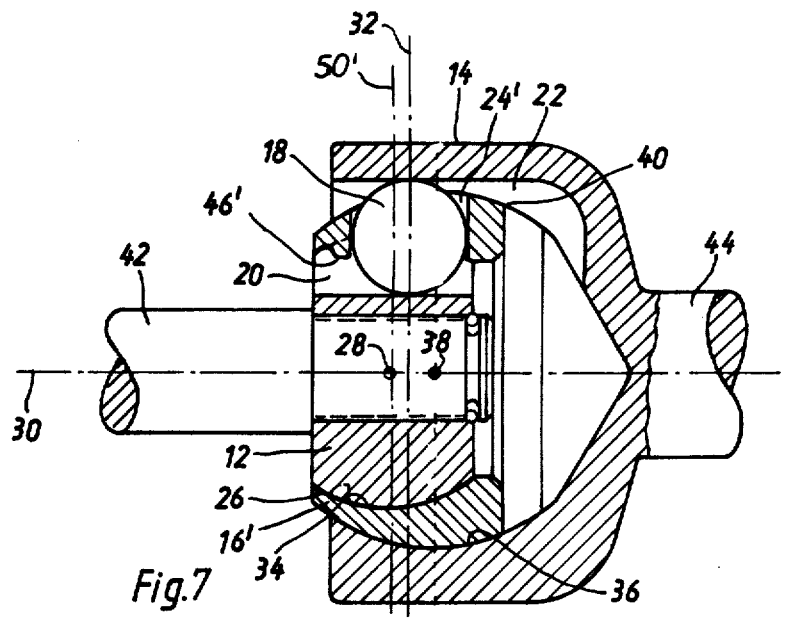
FIG. 7 is a view similar to FIG. 1 but illustrating a second embodiment of a cage according to this invention.

In the modification shown in FIG. 7, the cage 16' has the lugs 46' projecting radially inwardly therefrom from the thin tapered end of the cage at the center of each window 24'. These lugs 46' project beyond the inner spherical surface of the thin end of the cage so that the inner circle of the lugs will have approximately the same inner diameter as the opposite right-hand end of the windows 24, as shown in FIG. 7. The coupling members 12 and 14 of the FIG. 7 embodiment are identical with the couplings of FIG. 1 and the FIG. 7 embodiment is assembled in analogous manner as described hereinabove in connection with FIGS. 3, 4, and 6. With the FIG. 7 embodiment, of course, cage 16', instead of being tilted on axis 50, is tilted with respect to inner coupling member 12 on axis 50' extending through center point 28 at right angles to axis 30.

From the above descriptions it will be understood that this invention provides a constant velocity or a homo-kinetic ball-type universal joint of minimum overall radial dimension having a cage filling the space between the inner and outer coupling members and provided with lugs or noses which increase the ball guiding surfaces of the windows of the cage at the thin end of the cage.

I claim:

1. A universal joint having a minimum radial thickness dimension and a maximum torque transmitting capacity comprising spherically nested inner coupling, cage, and outer coupling members, said inner and outer coupling members having ball grooves therein, said cage having windows between the ball grooves, balls carried in a common plane by the windows of said cage and connecting said inner and outer coupling members in torque transmitting free tilting relation, the tilting centers of the inner and outer coupling members lying on opposite sides of the plane of the balls in said cage, said cage tapering from a thick end to a thin end to fill the radial space between the inner and outer coupling members, and radial lugs projecting from the thin end of the cage at the centers of the windows to increase the guide surfaces of the balls at the thin end of the cage and to strengthen the cage.

2. The joint of claim 1 wherein the lugs project radially outward into the grooves of the outer coupling.

3. The universal joint of claim 1 wherein the lugs project radially inward into the grooves of the inner coupling.

4. The universal joint of claim 1 wherein the cage is conical in cross section and the lugs are arranged at the ends of the windows toward which the cage tapers and project beyond a periphery of the thin end of the cage to increase the radial thickness of the thin end of the cage to at least the radial thickness of the thick end of the cage.

5. A homo-kinetic universal joint transferring torque through at least three balls, which are guided in axis-parallel grooves of an inner joint member and an outer joint member and are retained in a common plane in windows of a cage having spherical inner and outer surfaces with centers offset on opposite sides of the common plane of the balls carried by the cage, said spherical surfaces being guided by a spherical outer surface of the inner joint member and a spherical inner surface of the outer joint member, said cage having a lug at least at one side of each window projecting outwardly beyond the spherical outer surface of the cage and engaging in the groove of the outer joint member to provide a guide for the ball member in the window, and said lugs in any sectional plane extending normal to an axis passing through the center of the spherical outer surface of the cage and through the center between adjacent windows and lying inside an annular area concentric with said axis and the inner circle of the annular area surrounding extremeties of the ball grooves which, when viewed in the same sectional plane are inner limit lines with respect to said axis and the outer circle of said annular area being circumscribed by such lines of the ball grooves which, when viewed in the same sectional plane, are the outer limit lines with respect to said axis.

6. The homo-kinetic universal joint of claim 5 wherein the cage is wedge-shaped in cross section and the lugs are disposed at the sides of the windows where the cage is reduced in thickness and project radially beyond the outer surface of the cage by a distance so that the total thickness of the cage measured across said lugs is the same as the radical thickness of said windows.

7. A homo-kinetic universal joint transferring torque through at least three balls which are guided in axis-parallel ball grooves of an inner joint member and an outer joint member and are retained in a common plane in windows of a cage having spherical inner and outer surfaces with centers offset axially by equal distance on different sides of a common plane of the balls held by the cage, said spherical surfaces being guided at a spherical outer surface of the inner joint member and a spherical inner surface of the outer joint member, said caging having a lug at least one side of each window projecting inwardly beyond the spherical surface of the cage and engaging the associated ball groove of the inner joint member and providing a guide for the associated ball in the window, all of said lugs in any sectional plane extending normal to the axis passing through the center of the spherical inner surface of the cage and through the center between adjacent windows, being disposed inside an annular area concentric with said axis, the inner circle of said annular area circumscribing all such lines of the ball grooves which, when viewed in the same sectional plane, are the inner limit lines with respect to said axis, and the outer circle of said annular area being circumscribed by all such lines of the ball grooves which, when viewed in the same sectional plane, are the outer limit lines with respect to said axis.

8. The homo-kinetic universal joint of claim 1 wherein the cage is wedge-shaped in cross section and the lugs are disposed at the sides of the windows where the cage is reduced in thickness and project radially by a distance such that the total thickness of the cage measured across the lugs is the same as the radial thickness of the cage at the other side of the windows.

9. A homo-kinetic universal joint transferring torque through at least three balls, which are guided in grooves of an inner joint member and an outer joint member and are retained in a common plane in windows of a cage having a spherical outer surface, said spherical outer surface being guided by a spherical inner surface of the outer joint member, said cage having a lug at least at one side of each window projecting outwardly beyond the spherical outer surface of the cage and engaging in the groove of the outer joint member to provide a guide for the ball member in the window, said lugs, in any sectional plane extending normal to an axis passing through the center of the spherical outer surface of the cage and through the center between adjacent windows lying inside an annular area concentric with said axis and the inner circle of the annular area surrounding extremeties of the ball grooves which, when viewed in the same sectional plane are inner limit lines with respect to said axis and the outer circle of said annular area being circumscribed by such lines of the ball grooves which, when viewed in the same sectional plane, are the outer limit lines with respect to said axis.

10. The homo-kinetic universal joint of claim 9 wherein the cage is wedge-shaped in cross section and the lugs are disposed at the sides of the windows where the cage is reduced in thickness and project radially beyond the outer surface of the cage by a distance so that the total thickness of the cage measured across said lugs is the same as the radial thickness of said windows at the other sides.

11. A homo-kinetic universal joint transferring torque through at least three balls which are guided in ball grooves of an inner joint member and an outer joint member and are retained in a common plane in windows of an cage having a spherical inner surface, said spherical inner surface being guided at a spherical outer surface of the inner joint member, said cage having a lug at least at one side of each window projecting inwardly beyond the spherical surface of the cage and engaging the associated ball groove of the inner joint member and providing a guide for the associated ball in the window, said lugs, in any sectional plane extending normal to the axis passing through the center of the spherical inner surface of the cage and through the center between adjacent windows, being disposed inside an annular area concentric with said axis, the inner circle of said annular area circumscribing all such lines of the ball grooves which, when viewed in the same sectional plane, are the inner limit lines with respect to said axis, and the outer circle of said annular area being circumscribed by all such lines of the ball grooves which, when viewed in the same sectional plane, are the outer limit lines with respect to said axis.

12. The homo-kinetic universal joint of claim 11 wherein the cage is wedge-shaped in cross section and the lugs are disposed at the sides of the windows where the cage is reduced in thickness and project radially by a distance such that the total thickness of the cage measured across the lugs is the same as the radial thickness of the cage at the outer side of the windows.

* * * * *